Nick A. Schuster
INVENTOR.

BY Richard E. Bee

ATTORNEY

United States Patent Office 3,136,942
Patented June 9, 1964

3,136,942
ELECTRICAL WELL LOGGING METHODS AND APPARATUS HAVING A FOCUSSED ELECTRODE SYSTEM INCLUDING PLURAL SURVEY CURRENT ELECTRODES
Nick A. Schuster, Houston, Tex., assignor to Schlumberger Well Surveying Corporation, Houston, Tex., a corporation of Texas
Filed June 16, 1959, Ser. No. 820,687
17 Claims. (Cl. 324—1)

This invention relates to electrical methods and apparatus for investigating subsurface earth formations traversed by a borehole and, particularly, to such methods and apparatus of the type which utilize a system of electrodes for emitting electrical current into the subsurface earth formations and providing indications of the electrical resistance properties of the particular formations traversed thereby.

It has become common practice to obtain records or logs of the resistivity or conductivity characteristics of the earth formations adjacent a well or borehole drilled into the earth by moving a system of electrodes through the borehole and determining the resistance presented by the earth formations to the flow of electrical current emitted from one of the electrodes. An electrical log obtained in this manner shows how the resistivity characteristics of the formations vary along the course of the borehole. These resistivity values aid in determining the lithological character of the various formations adjacent the borehole.

Instead of determining the absolute value of the resistivity or conductivity of the earth formations at the various depths in the borehole, it would in many instances be more useful to determine the rate of change of the resistivity or conductivity with borehole depth. For example, in one form of apparatus, commonly known as dipmeter apparatus, three similar electrode systems are utilized to measure the resistivity or conductivity of the formations at three circumferentially spaced locations around the wall of the borehole in order to determine the dip angle of the boundary between two adjacent earth formation regions having different resistivity characteristics. If the resistivity changes recorded for the three electrode systems occur at different borehole depths, then this indicates the deparutre of the formation boundary plane from a right angle relation with respect to the borehole axis which, for a perfectly vertical borehole, represents the departure of the boundary plane from a horizontal position. The magnitude of this dip angle may be determined from the relative depth levels at which the same resistivity change occurs for the three electrode systems. In measuring the formation dip angle, therefore, the information about dip comes primarily from a change in resistivity or, in other words, a resistivity gradient, rather than from the absolute value of the resistivity. More accurate knowledge of the resistivity gradient would also be useful in other instances.

A problem is sometimes encountered in the electrical logging of earth formations in that it is sometimes difficult to get the electrical current to flow into the uncontaminated portions of the earth formations in the desired manner. This is particularly likely to occur adjacent a permeable earth formation where filtrate from the drilling mud has invaded the formation to an appreciable extent and a mud cake of appreciable thickness has been built up on the wall of the borehole.

To alleviate this difficulty, so-called "focussed" electrode systems have been heretofore proposed. In these focussed systems, the principal current flow used for determining or surveying the formation resistance characteristics is constrained to the desired flow pattern by emitting focussing current adjacent thereto for opposing any surveying current tending to flow in an undesired direction. In this manner, the surveying current may be caused to penetrate laterally into the earth formations for an appreciable distance. It would, in many cases, be particularly useful if this focussing technique could be adapted to the measurement of the formation resistivity gradient.

While the forms of focussed electrode systems heretofore proposed have met with much success in actual practice, it would on occasion be useful to have an improved form of focussed electrode system having a greater depth of lateral penetration. This would be particularly true in the case of a system for measuring the formation resistivity gradient.

It is an object of the invention, therefore, to provide new and improved methods and apparatus for measuring the electrical resistance properties of earth formations adjacent a borehole.

It is another object of the invention to provide new and improved methods and apparatus for measuring the resistivity gradient of earth formations adjacent a borehole.

It is a further object of the invention to provide a new and improved focussed electrode system having a greater depth of lateral penetration and which is less affected by the presence of any mud cake on the borehole wall.

It is an additional object of the invention to provide a new and improved focussed electrode system for measuring the resistivity gradient.

It is yet another object of the invention to provide new and improved dipmeter apparatus for measuring the dip angle of the boundary between adjacent earth formation regions having different resistivity characteristics.

It is a still further object of the invention to provide new and improved methods and apparatus for detecting any oil-water boundary present in a porous earth formation.

In accordance with one feature of the invention, apparatus for investigating earth formations traversed by a borehole comprises means for emitting survey current at two spaced apart points in a borehole. The apparatus also includes means for emitting focussing current adjacent these two points for directing the survey current flow from each of these points into the adjacent earth formation. In addition, the apparatus includes means responsive to the flow of the survey currents for providing an indication of the earth formation resistivity gradient intermediate the two points.

In accordance with another feature of the invention, an electrode pad comprises support means and a pair of survey current electrodes affixed to the support means. The pad also includes a focussing current electrode affixed to the support means and having portions defining a path encircling the survey current electrodes.

For a better understanding of the present invention, together with other and further objects thereof, reference is had to the following description taken in connection with the accompanying drawings, the scope of the invention being pointed out in the appended claims.

Referring to the drawings.

Figures 1, 2, 3, 4:
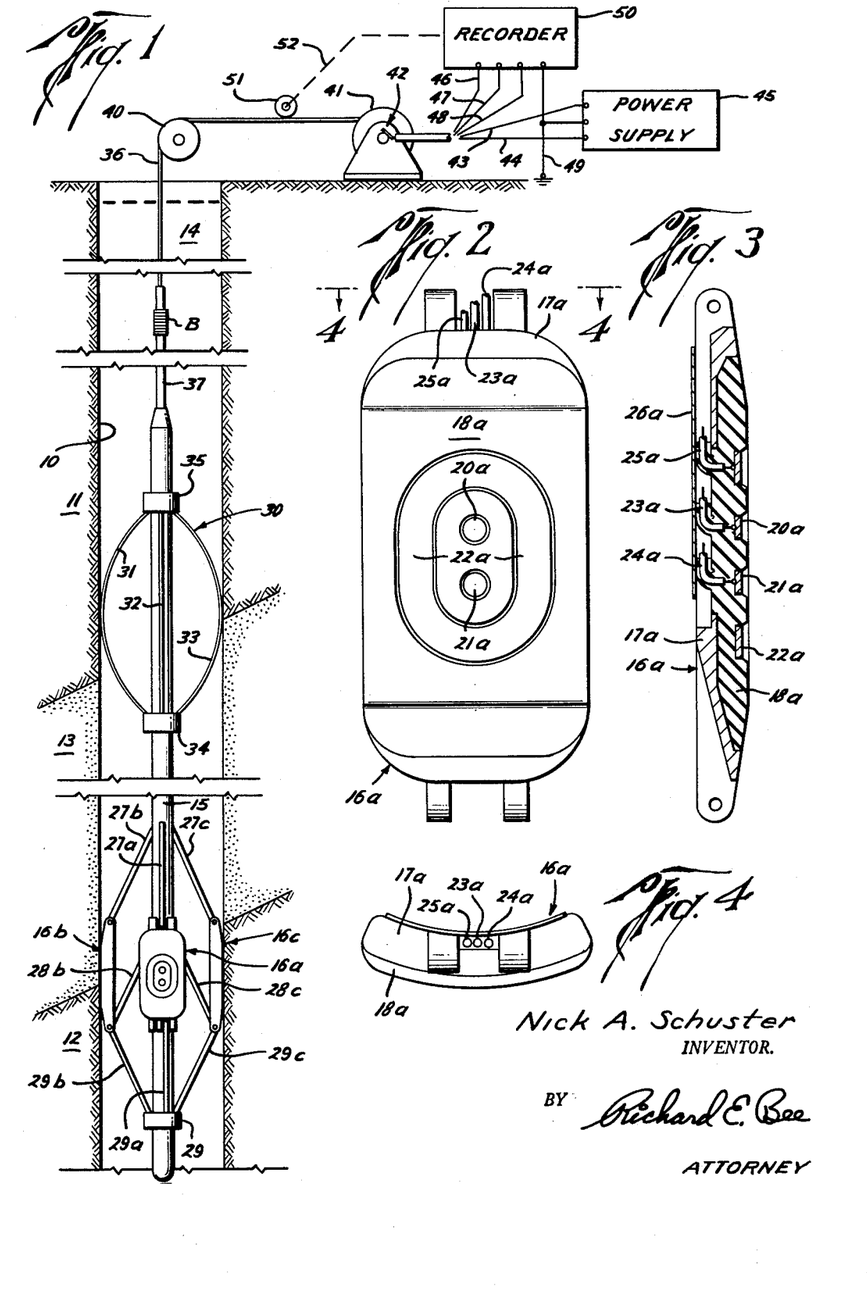
FIG. 1 illustrates a representative embodiment of borehole investigating apparatus constructed in accordance with the present invention.
FIG. 2 is an enlarged elevational view of the wall-engaging face of one of the electrode pads of the FIG. 1 apparatus.
FIG. 3 is a longitudinal cross section of the electrode pad of FIG. 2.
FIG. 4 is a top view of the electrode pad of FIG. 2.

Referring to FIG. 1 of the drawings, there is shown a representative embodiment of apparatus constructed in accordance with the principles of the present invention for investigating earth formatins traversed by a borehole 10. The earth formations of interest may include, for example, impervious sections 11 and 12 of earth material such as shale and a permeable section 13 of material such as sand. The borehole 10 is usually filled with a conductive drilling fluid or drilling mud 14. For the sake of a specific example, the present invention, as depicted in FIG. 1, will be described for the case of dipmetering apparatus for investigating the angle of boundaries between different earth formation regions traversed by the borehole 10. A typical example of a formation boundary is illustrated by the boundary between formation regions 12 and 13 of FIG. 1. To this end, the representative embodiment of the invention shown in FIG. 1 includes an elongated support member or instrument housing 15. Affixed to the lower end of the instrument housing 15 are three wall-engaging pad members or electrode pads 16a, 16b and 16c. These three electrode pads are angularly spaced apart around the circumference of the borehole 10, usually at 120° intervals.

As shown more in detail in FIGS. 2, 3 and 4 for the electrode pad 16a, each of these electrode pads includes support means which, for the representative embodiment being discussed, includes a metal frame 17a and a flexible rubber pad 18a. The other electrode pads 16b and 16c will include similar elements. The face of the flexible rubber pad 18a thus forms an insulated wall-engaging face and has affixed thereto a pair of survey current electrodes 20a and 21a and a focussing current electrode 22a. The survey current electrodes 20a and 21a are located centrally on the flexible rubber pad 18a and are spaced apart from one another for separately emitting survey current into the adjacent earth formations. The focussing current electrode 22a includes portions defining a path encircling the survey current electrodes 20a and 21a for emitting focussing current adjacent thereto for directing the survey current flow from each survey current electrode into the adjacent earth formations. As shown in FIG. 2, the focussing current electrode 22a forms a continuous conductive surface completely encircling the survey current electrodes 20a and 21a. This electrode surface is spaced inwardly from the outer edge of the rubber pad 18a. As shown in FIG. 3, each of the electrodes 20a, 21a and 22a is recessed somewhat into the face of the rubber pad 18a. Electrical connections are made to the pad electrodes by way of insulated conductors 23a, 24a and 25a which run up the backside of the metal frame 17a beneath a protectice cover plate 26a to the instrument housing 15.

As seen in FIG. 1, each of the electrode pads 16a, 16b and 16c includes means for urging the wall-engaging face thereof against the borehole wall. To this end, the electrode pad 16a is pivotally connected to the instrument housing 15 by way of support arms 27a, 28a and 29a, the arm 28a being hidden in this view. The other electrode pads include similar support arms. The support arms are pivotally connected to both the instrument housing 15 and to the electrode pads, as indicated. The lower ends of arms 29a, 29b and 29c are fastened to the housing 15 by way of a slidable collar member 29. Suitable means are included within the instrument housing 15 for actuating the arms and urging the three electrode pads outwardly against the borehole wall when in use and for retracting the same when not in use.

Affixed to the upper portion of the instrument housing 15 is a bowed spring centering guide assembly 30 for assisting in centering the instrument housing 15 in the borehole. Note that the three electrode pads at the lower end of the instrument housing also serve as a centering guide. The upper centering guide 30 includes bowed springs 31, 32 and 33 suitably connected to collar members 34 and 35. One collar member is firmly secured to the instrument housing 15 while the other collar member is slidably mounted so as to allow for expansion and contraction of the bowed springs.

The instrument housing 15 is suspended from the surface by means of an armored multiconductor cable 36 which is connected to the top end of the instrument housing 15. The various electrical conductors contained within the cable 36, which are insulated from one another, serve to interconnect the downhole electrical circuits with the electrical apparatus at the surface. The first 100 feet or so of the cable adjacent the top of the instrument housing 15 may be covered with a boot of rubber insulation 37. At the surface, the cable 36 passes over a pulley or sheave 40 and then to a suitable drum and winch mechanism 41. In this manner, the instrument housing 15 may be raised and lowered in the borehole as desired.

Electrical connection is made to the cable conductors by way of a suitable slip ring and brush contact assembly 42. Conductors 43 and 44 connect appropriate ones of the contact brushes to a power supply unit 45. Similarly, conductors 46, 47 and 48 connect appropriate additional contact brushes to a recorder 50. The ground interconnections for the surface equipment are indicated symbolically by a grounded conductor 49. Recorder 50 is of the multiunit galvanometer type for recording a plurality of curves or traces on a moving recording medium such as photographic film. In order to synchronize movement of the recording medium with the movement of the downhole instrument housing 15, a mechanical measuring wheel 51 engages the cable 36 and is mechanically coupled to the recorder 50 as indicated by dash-line 52 for suitably driving the recording medium.

Figures 5, 6:
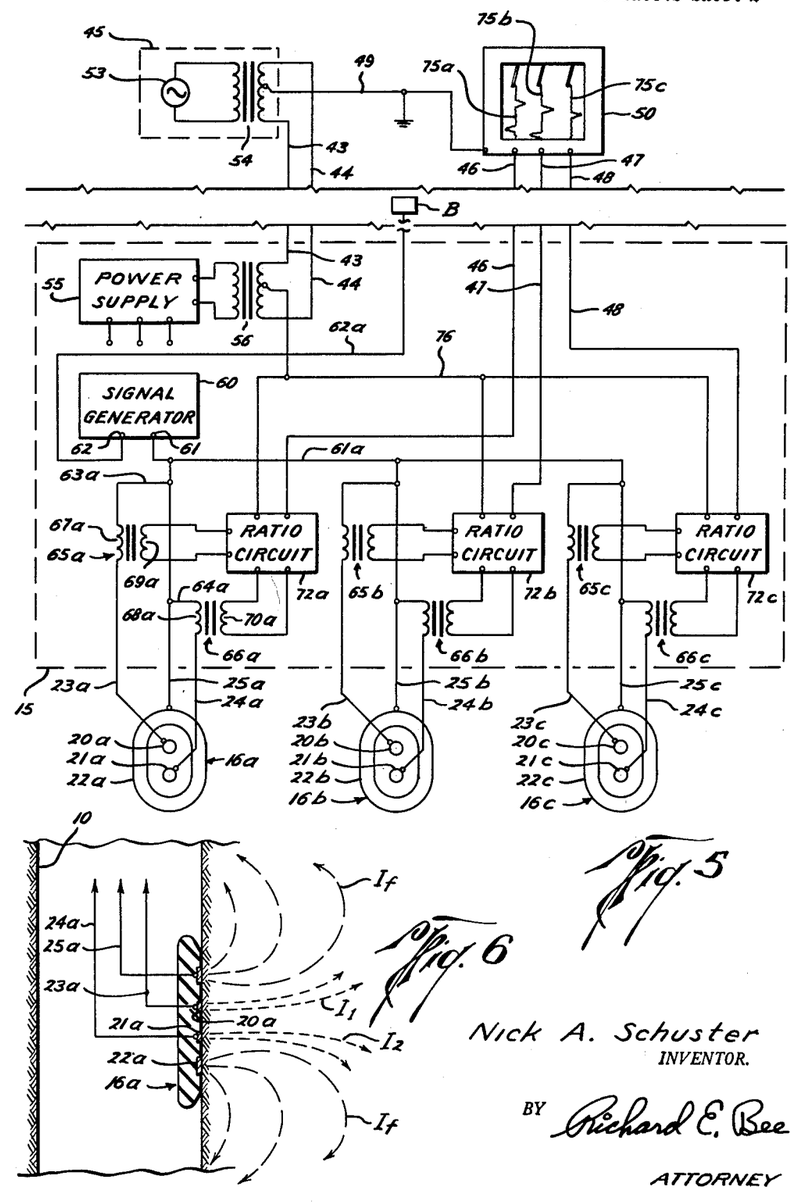
FIG. 5 is a circuit diagram of a representative embodiment of electrical circuits which may be used with the FIG. 1 apparatus.
FIG. 6 is an enlarged cross-sectional view of a borehole and an electrode pad constructed in accordance with the present invention.

Referring now to FIG. 5 of the drawings, there is shown a representative form which the electrical circuits for operating the present invention may take. As there shown, the surface power supply 45 includes a source 53 of alternating current energy for providing alternating current power at, for example, a frequency of 60 cycles. This alternating current energy is supplied by way of a transformer 54, and cable conductors 43 and 44 to a downhole power supply 55 by way of a transformer 56. A center tap on the secondary winding of transformer 54 is connected to the surface equipment ground conductor 49, while a center tap on the primary winding of downhole transformer 56 is connected to a suitable downhole equipment ground conductor 76. The power supply 55 serves to supply the various direct-current operating voltages required by the downhole circuits, the supply voltage interconnections being omitted for simplicity.

The dash-line box 15 of FIG. 5 corresponds to the instrument housing 15 of FIG. 1. This indicates that the down-hole circuits are contained within the interior of the instrument housing 15 of FIG. 1, preferably in a fluid-tight compartment therein.

The downhole electrical circuits shown in FIG. 5 include circuit means for energizing each of the various electrodes of each of the electrode pads 16a, 16b and 16c. For sake of simplicity, only the circuits and connections associated with the electrode pad 16a will be discussed in detail, it being understood that the other electrode pads 16b and 16c have similar circuit connections. With this in mind, the downhole circuits include circuit means represented by signal generator 60 for supplying an energizing voltage between a pair of output terminals 61 and 62. This signal generator 60 includes a suitable oscillator circuit for generating an alternating-current energizing voltage having a frequency of, for example, 400 cycles per second.

The circuit means for energizing the survey current electrode 20a of pad 16a includes a conductor 63a and the previously-mentioned conductor 23a which form a series connection between the supply circuit output terminal 61 and the electrode 20a. Similarly, the circuit means for energizing the survey current electrode 21a includes a conductor 64a and previously-mentioned conductor 24a, these conductors forming a series connection between the output terminal 61 and the electrode 21a. The circuit means for energizing the focussing current electrode 22a includes the conductor 25a which connects the electrode 22a to the output terminal 61. In this manner, each of the electrodes is energized to emit electrical current into the adjacent earth formations, the current flow from the focussing current electrode 22a serving to focus or direct the survey currents into the formations in the desired manner. The other output terminal 62 of signal generator 60 is connected by way of a conductor 62a to the electrically-remote current-return electrode B which thus serves as a current-return point for the electrical currents emitted into the earth formations.

The various electrodes of the other electrode pads 16b, 16c are coupled in a similar manner to the output terminal 61 of signal generator 60. It should be noted that all of the electrodes for all of the pads are connected to this same output terminal 61.

The downhole electrical circuits of FIG. 5 also include means responsive to the flow of the survey currents for providing an indication of the earth formation resistivity gradients intermediate the two survey current electrodes of each electrode pad. For the electrode pad 16a, this means includes means responsive to the flow of each of the two survey currents for developing a pair of measure signals individually representative of the respective survey current. This includes a pair of transformers 65a and 66a having low impedance primary windings 67a and 68a, respectively, each connected in series with the supply circuit connection for the respective survey current electrode. For example, for the survey current electrode 20a, the primary winding 67a is connected in series with the conductors 23a and 63a and, thus, to the supply circuit output terminal 61 of signal generator 60.

The means for providing an indication of the earth formation resistivity gradient also includes for each electrode pad circuit means responsive to the two measure signals for combining these two signals to provide the desired indication. For the embodiment illustrated in FIG. 5, this includes for the pad 16a a ratio circuit 72a coupled to secondary windings 69a and 70a of transformers 65a and 66a, respectively, for combining the two measure signals developed across the secondary windings for developing a signal representative of the ratio of these two measure signals. The resulting ratio signal from the ratio circuit 72a is then supplied by way of cable conductor 46 to the recorder 50 located at the surface of the earth to produce a record or trace 75a on the recording medium thereof. The other output terminal of the ratio circuit 72a is connected to a conductor 76 which, in turn, is connected to the center tap on transformer 56. In this manner there is formed with the surface equipment ground conductor 49 a phantom-type ground return circuit for the ratio signal transmitted up cable conductor 46.

If necessary, suitable amplifier circuits may be connected between the output of ratio circuit 72a and the recorder 50. Also, if it is desired to transmit direct-current ratio signals up the cable and a ratio circuit of a type providing an alternating-current output is utilized, then a suitable rectifier circuit may be located downhole and connected between the output of the ratio circuit 72a and the cable conductor 46.

The other electrode pads 16b and 16c have corresponding circuit elements for providing output signals which, in a similar manner, produce traces 75b and 75c, respectively, on the recording medium of recorder 50. The phantom-type ground return circuit is used as a common current return circuit for each of the cable conductors 46, 47 and 48.

For the case of dipmeter apparatus, there is also included within the instrument housing 15 suitable inclinometer apparatus for providing an indication of the angle of inclination of the instrument housing 15 relative to the vertical and the direction of such inclination. For sake of simplicity, this apparatus is not shown in the drawings.

Considering the operation of the apparatus thus far described, as the instrument housing 15 of FIG. 1 is moved through the borehole in, say, an upwardly direction, the three electrode pads 16a, 16b and 16c are urged against the wall of the borehole 10 and thus move in unison along the wall of the borehole in an upwardly direction. At the same time, the survey current electrodes of each of the electrode pads are energized for emitting current into the formations at two spaced apart points for each pad. Simultaneously therewith, focusing current is emitted adjacent each pair of survey current electrodes by their respective focussing current electrode. Such focussing current serves to constrain or direct the flow of survey current into adjacent earth formation in a generally horizontal manner.

As shown in FIG. 5, this is accomplished for the case of the electrode pad 16a by supplying the energizing voltage or potential appearing at the output terminal 61 of signal generator 60 to each of the electrodes 20a, 21a and 22a of the pad 16a. The transformer primary windings 67a and 68a are constructed to present a very small series impedance so that all three of the electrodes 20a, 21a and 22a are maintained at, or very near, the same potential level. This equal potential operation of the three electrodes for each pad assists in producing the desired focussing action on the two survey current beams as the formation resistivity varies.

A typical current flow pattern for one of the electrode pads, namely, the pad 16a, is shown in FIG. 6. As there shown, a pair of survey current beams $I_1$ and $I_2$ are emitted from the survey current electrodes 20a and 21a, respectively. Surrounding focussing current flow $I_f$ from the focussing current electrode 22a serves to oppose any tendency of the survey currents $I_1$ and $I_2$ to diverge or depart from their desired beam patterns until after they have penetrated a substantial distance into the formations. Looking at it in another way, equal potential operation of the focusing and survey current electrodes serves to establish a region of substantially zero potential gradient encircling the survey current electrodes in the vicinity of the borehole wall. The presence of this zero potential gradient region denotes the absence of current flow components across its boundaries. In this way, the survey currents $I_1$ and $I_2$ are caused to penetrate laterally into the earth formations in such a manner as to be substantially unaffected by the presence of any mudcake that may have been formed on the borehole wall where the filtrate from the borehole drilling mud may have invaded the formations to some extent. The fact that all three of the electrode pads are operated at substantially the same potential also helps in obtaining the desired flow patterns for the survey currents.

Returning to FIG. 5 and considering first the measure signal circuits for the electrode pad 16a, the magnitude of survey current emitted from each of the survey current electrodes 20a and 21a and, hence, the magnitude of the currents flowing through the transformer primary windings 67a and 68a will vary as the formation resistivities opposite these electrodes vary. In particular, these magnitudes will vary inversely with resistivity or, in other words, directly as formation conductivity. For each survey current electrode the relationship between the electrode potential or voltage V, the electrode current I and the adjacent formation resistivity R may be described by the well-known relationship:

$$R = k\frac{V}{I} \quad (1)$$

where "k" represents a proportionality constant determined by the physical geometry of the electrode system. Specifically, for the case of electrode 20a this relationship may be rewritten as follows:

$$I_1 = k\frac{V}{R_1} = kVC_1 \quad (2)$$

where $R_1$ denotes the formation "resistivity" opposite electrode 20a, while $C_1$ denotes the formation "conductivity" opposite electrode 20a. Similarly, the relationship for survey current electrode 21a may be expressed as:

$$I_2 = k\frac{V}{R_2} = kVC_2 \quad (3)$$

It will be noted that because of the equal potential operation the same voltage value V is used in both Equations 2 and 3.

As a result of the flow of these survey currents $I_1$ and $I_2$ from the survey current electrodes 20a and 21a, respectively, there will result across the secondary windings 69a and 70a voltage signals proportional thereto. These voltage signals are then supplied to the ratio circuit 72a wherein they are combined to form an output ratio signal $V_o$ which may be described by the following relationship:

$$V_o = \frac{I_1}{I_2} = \frac{R_2}{R_1} = \frac{C_1}{C_2} \quad (4)$$

Note that in deriving Equation 4 from Equations 2 and 3, the electrode voltage factors V cancel one another. This means that as far as the output signal $V_o$ is concerned, it is immaterial whether the electrode voltage is held constant or allowed to vary. This output ratio signal $V_o$ is then transmitted up cable conductor 46 and recorded as a trace 75a on the recorder 50 at the surface of the earth.

When the formation resistivities opposite the two survey current electrodes 20a and 21a are equal in value, then the output ratio signal $V_o$ will assume a value of unity. This value of unity may be taken as the zero axis or zero resistivity gradient reference line for the trace 75a. When the electrode pad 16a reaches the boundary between two formation regions having different resistivity values, such as represented by the boundary between regions 12 and 13 of FIG. 1, then the two current flow values $I_1$ and $I_2$ will become unequal and the output signal $V_o$ will become greater or less than the unity reference value, depending on whether the resistivity opposite survey electrode 20a is greater or smaller than the resistivity opposite survey current electrode 21a. In this manner, a deflection will be produced on the trace 75a as the electrode pad 16a passes the boundary. Once the electrode pad is past the boundary, so that the resistivity is again the same opposite the two survey electrodes, then the recorder trace returns to its zero reference value. Consequently, a relatively sharp and well-defined pip or pulse will occur on the recorder trace whenever the electrode pad crosses a formation boundary. Whether this pulse will be to the right or to the left of the zero reference line will depend on whether the electrode pad is going from a region of higher resistivity to a region of lower resistivity or vice versa. The amplitude or height of this pulse will be indicative of the magnitude of the resistivity gradient experienced in crossing the boundary or, in other words, it will be indicative of the difference between the resistivity values on the two sides of the boundary.

The other two electrode pads 16b and 16c will operate in a corresponding manner to produce, respectively, recorder traces 75b and 75c. In each case, pips or deflections will again occur wherever the corresponding pad crosses a formation boundary.

Whenever the formation boundary plane is inclined at an angle relative to the horizontal, then the corresponding pips or deflections from the three angularly spaced electrode pads will occur at different depths in the borehole. The values of these differences in relative depths at which these pips occur for the same formation boundary may then be utilized in a well-known manner to calculate the dip angle of the boundary plane relative to the horizontal or, more accurately, relative to a plane at right angles to the longitudinal axis of the borehole. This dip data relative to the borehole, together with suitable inclinometer data concerning the deviation of the borehole from the vertical as well as the direction of such deviation, may be utilized to compute the value of the formation dip angle relative to a true horizontal as well as the geographical direction of such dip.

An advantage of measuring the resistivity gradient, as opposed to the absolute value of formation resistivity, at the three angularly spaced electrode pad locations is that the formation boundaries will be more sharply defined. This will, in turn enable the dip computations to be made with greater accuracy.

Figures 7, 8:
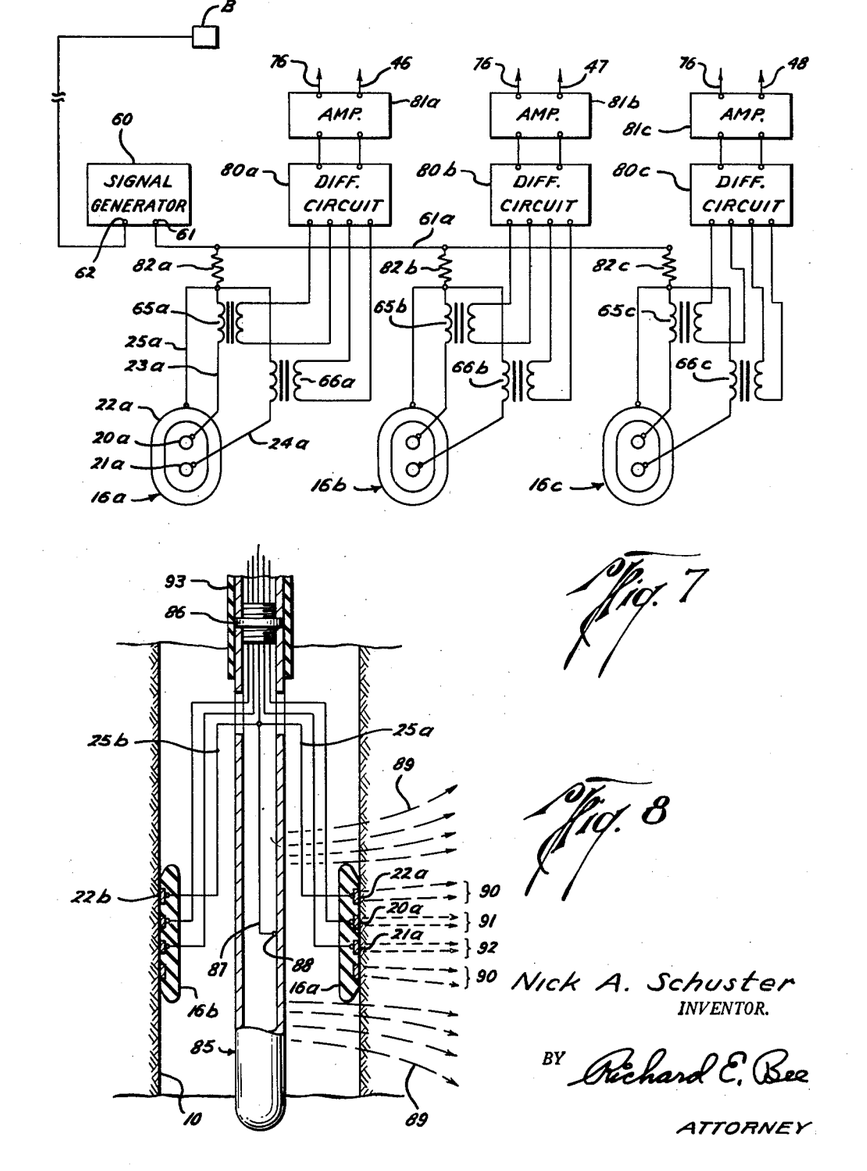
FIG. 7 is a circuit diagram of a modified system of electrical circuits which may be used with the electrode pads of the FIG. 1 apparatus.
FIG. 8 is a partially cross-sectional view of a modified form of a portion of the FIG. 1 apparatus.

Referring now to FIG. 7 of the drawings, there is shown a circuit diagram of a modified system of electrical circuits which may instead be used with each of the electrode pads of the FIG. 1 apparatus. The circuit of FIG. 7 differs from that of FIG. 5 primarily in that the pairs of current-representative measure signals developed across the secondary windings of transformers 65a and 66a, 65b and 66b, and 65c and 66c are supplied to "difference" circuits 80a, 80b and 80c, respectively, instead of being supplied to "ratio" circuits 72a, 72b and 72c. The output difference signals from difference circuits 80a, 80b and 80c of FIG. 7 are then supplied, respectively, by way of amplifiers 81a, 81b and 81c and cable conductors 46, 47 and 48 to recorder 50 at the surface of the earth, the latter unit not being shown in FIG. 7 for sake of simplicity.

The output difference signal $V_o$ of difference circuit 80a, for example, may be described by the relationship:

$$V_o = I_1 - I_2 = kV(C_1 - C_2) \quad (5)$$

This relationship is derived from Equations 2 and 3.

Assuming that the electrode voltage V is constant, then Equation 5 can be rewritten in the following form:

$$V_o = K\frac{\Delta C}{\Delta z} \quad (6)$$

"$\Delta z$" denotes the spacing between the two survey current electrodes, "$\Delta C$" denotes the change in or difference in conductivity between the two survey current electrodes and "K" denotes the new proportionality constant. In the limit, for very small electrode separations $\Delta z$, the differential factor of Equation 6 approaches a true derivative and, hence, the output difference signal $V_o$ approaches an instantaneous resistivity gradient value. It is thus seen that the use of a difference circuit leads to an output signal which is more directly related to the resistivity gradient or, more accurately, the "conductivity" gradient. Similar considerations apply for the other electrode pads 16b and 16c.

At first glance, then, it would appear from Equation 5 that the electrode voltage "V" should be held constant. With respect to the deflection recorded by recorder 50, however, this would give greater emphasis to a given percentage change in resistivity where the absolute values of the two resistivities are relatively low and less emphasis where the absolute values are relatively high. In other words, a greater deflection would be recorded for the same percentage change where the absolute resistivities are relatively low. For example, a two-to-one change in resistivity where the resistivities on the two sides of the boundary are one and two ohms, respectively, would produce a recorder deflection of 0.5 unit, whereas a two-to-one change when the resistivities are 10 and 20 ohms would produce a deflection of 0.05 unit on the recorder trace. The recorder deflection in the first case is 10 times larger than that in the second case. Note that the recorder deflection for this embodiment is in terms of "conductivity," the reciprocal of "resistivity."

From an interpretation standpoint, it would be better if the same percentage change in resistivities were given the same weight in terms of recorder trace deflection. This equal weighting is obtained automatically in case of the ratio circuit of FIG. 5. In the case of the FIG. 7 difference circuits, this same result can be approximately obtained by allowing the electrode voltage "V" of each pad to change as the formation resistivity changes. When this is done, the electrode voltage will increase as the formation resistivity increases. As indicated by Equation 5, this will give greater weight to the difference signal obtained when the resistivities are larger.

The electrode voltage "V" may ve caused to vary as a function of formation resistivity by feeding the electrode current from a relatively high impedance source. This is indicated in FIG. 7 by the use of resistors 82a, 82b and 82c, each having a relatively high impedance value, connected in series between the common voltage supply conductor 61a and the conductors associated with the respective electrode pads. Note for the electrode pad 16a that as the absolute value of the electrode voltage varies, the three electrodes 20a, 21a and 22a at any given instant are still energized with equal voltages or potentials. Thus, the focussing action is not disturbed. Similar considerations apply for the other electrode pads 16b and 16c. The use of separate high-impedance resistors for the three electrode pads allows the three pads to operate at different absolute voltage levels when the formation resistivities opposite the pads differ.

For dipmeter apparatus using either the FIG. 5 or the FIG. 7 type of circuits, the signal from one electrode of each pad could also be separately recorded to provide three conventional-type dipmeter traces on the recorder 50 in addition to the three gradient traces obtained by means of the present invention. Also, each single electrode signal could be combined with the corresponding gradient signal to produce a combined signal for each electrode pad of the form:

$$V_o = aR + b\frac{dR}{dz} \qquad (7)$$

where "a" and "b" denotes suitable proportionality constants. This would produce a more conventional type of dipmeter trace with the formation boundaries somewhat enhanced.

From the foregoing, it is seen that dipmeter apparatus constructed in accordance with the present invention provides more accurate indications of the formation boundary planes and, hence, enables more accurate computation of the formation dips. While the techniques of the present invention have been illustrated for the case of a dipmeter, it is apparent that a single electrode pad together with its associated circuits could be used to measure the formation resistivity gradient in other cases where this information is desired.

In some cases, the survey current beams from an electrode pad will not penetrate far enough into the adjacent formation to obtain an accurate measure of the true resistivity of the uncontaminated portion thereof. For example, the presence of mud filtrate invasion into the formation for a considerable distance will cause the survey current beams to diverge appreciably before the uncontaminated portion of the formations is reached. Greater depth of lateral penetration can be provided, as shown in FIG. 8 of the drawings, by also emitting focusing current from the surface of instrument housing 85. In this case, the lower portion of the instrument housing 85 is electrically separated from the upper portion by means of a non-conductive spacer member 86 which may be threaded into the two adjacent portions of the instrument housing 85. The spacer member 86 may be made of a tough plastic material such as epoxy-glass resin. The various conductors from the electrode pads pass through fluid-tight passages in the spacer member 86. Connected to the conductors 25a and 25b which supply the energizing potential to the focussing current electrodes 22a and 22b is an additional conductor 87 which serves to supply the same energizing potential to the lower portion of the instrument housing 85. Conductor 87 is connected to the interior of the instrument housing 85 at a point 88 adjacent the location of the electrode pads 16a and 16b.

In this manner, the lower portion of the instrument housing 85 constitutes a conductive surface for emitting additional focussing current 89 therefrom. This additional focussing current 89 is radiated outwardly in all directions to further assist the focussing current 90 from electrode 22a in directing survey current beams 91 and 92 laterally into the earth formations. As a result, deeper lateral penetration is obtained even under adverse formation conditions. As before, the current-return point for the emitted focussing and survey currents is located a sufficient distance up the borehole so as to be electrically remote from the electrode pads. Also, the portion of the instrument housing 85 above the spaced member 86 is covered with electrical insulation material 93.

The modified instrument housing system of FIG. 8 may be used with the electrical circuits shown in FIG. 5 by connecting the housing conductor 87 to the focussing current electrode conductors as shown in FIG. 8. For the case of the FIG. 7 circuits, however, where voltage adjusting resistors 82a, 82b and 82c are used, the circuit should be somewhat modified. In particular, only a single common voltage adjusting resistor should be used and all electrode conductors as well as the housing conductor 87 should be connected to the output side of this common resistor. In this way, all the electrode surfaces will be at the same potential level. This potential or voltage level will be determined primarily by the formation resistance seen by the current-emitting portion of the instrument housing 85. This technique of emitting additional focussing current from the instrument housing is also useful in connection with other types of wall-engaging electrode systems.

The use of dipmeter apparatus constructed in accordance with the present invention enables the boundary between oil and water zones in a porous formation to be detected. The presence of both oil and water in a porous formation tends to produce a resistivity gradient because the oil tends to migrate towards the upper regions of the formation. This oil-water boundary may be distinguished from other types of formation boundaries in that it is always horizontal, assuming no fluid flow is taking place. Thus, the presence of a horizontal boundary indicates the presence of oil in regions where the formation boundaries are not normally horizontal. In this manner, a positive indication is directly obtained of the presence of oil. For this type of measurement, dipmeter apparatus having a greater depth of lateral penetration will usually be preferred in order to overcome the effect of any invasion of the formations by drilling mud filtrate.

From the foregoing descriptions of the various embodiments of the present invention, it is seen that apparatus constructed in accordance therewith enables more accurate determinations of various formation boundaries. In particular, such apparatus enables the dip angles of formation boundaries to be determined with greater accuracy.

While there have been described what are at present considered to be preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A method of investigating earth formations traversed by a borehole comprising: simultaneously emitting first and second survey currents at two vertically spaced apart points in a borehole; emitting focussing current adjacent said points for directing the survey currents into the adjacent earth formations; obtaining an indication representative of the survey current flow from each of said two points; and combining these two indications for providing an indication of the earth formation resistivity gradient intermediate said two points.

2. A method of investigating earth formations traversed by a borehole comprising: emitting survey current at two vertically spaced apart points in a borehole; emitting focussing current adjacent said points for directing the survey current flow from each of said two points into the adjacent earth formations; obtaining a pair of measure signals representative of the magnitudes of survey current flowing from said two points; and combining these two signals for providing a single signal representative of the earth formation resistivity gradient intermediate said two points.

3. In apparatus for investigating earth formations traversed by a borehole, the combination comprising: means for simultaneously emitting first and second survey currents at two vertically spaced apart points in a borehole; means for emitting focussing current adjacent said points for directing the survey currents into the adjacent earth formations; and means responsive to the flow of both of said survey currents for providing an indication of the earth formation resistivity gradient intermediate said two points.

4. In apparatus for investigating earth formations traversed by a borehole, the combination comprising: a wall-engaging pad member adapted for movement through a borehole and having a wall-engaging face comprising a pair of survey current electrodes and a focussing current electrode having portions defining a path encircling the survey current electrodes; circuit means for energizing each of the survey current electrodes for emitting survey currents therefrom; circuit means energizing the focussing current electrode for emitting focussing current therefrom for directing the survey current flow from each of the survey current electrodes into the adjacent earth formations; and means responsive to the flow of the survey currents for providing an indication of the earth formation resistivity gradient intermediate the two survey current electrodes.

5. In apparatus for investigating earth formations traversed by a borehole, the combination comprising: a wall-engaging pad member adapted for movement through a borehole and having a wall-engaging face comprising a pair of survey current electrodes and a focussing current electrode having portions defining a path encircling the survey current electrodes; circuit means for supplying substantially the same energizing potential to each of the survey current electrodes and to the focussing current electrode for emitting survey currents from the survey current electrodes and for emitting focussing current from the focussing current electrode for directing the survey current flow from each of the survey current electrodes into the adjacent earth formations; and means responsive to the flow of the survey currents for providing an indication of the earth formation resistivity gradient intermediate the two survey current electrodes.

6. In apparatus for investigating earth formations traversed by a borehole, the combination comprising: a wall-engaging pad member adapted for movement through a borehole and having an insulated wall-engaging face portion including a pair of survey current electrodes affixed thereto and a focussing current electrode affixed thereto having portions defining a path encircling the survey current electrodes; circuit means for energizing each of the survey current electrodes for emitting survey currents therefrom; circuit means for energizing the focussing current electrode for emitting focussing current therefrom for directing the survey current flow from each of the survey current electrodes into the adjacent earth formations; and means responsive to the flow of the survey currents for providing an indication of the earth formation resistivity gradient intermediate the two survey current electrodes.

7. In apparatus for investigating earth formations traversed by a borehole, the combination comprising: a wall-engaging pad member adapted for movement through a borehole and having a wall-engaging face comprising a pair of survey current electrodes and a focussing current electrode having portions defining a path encircling the survey current electrodes; means for urging the wall-engaging face of the pad member against the borehole wall; circuit means for energizing each of the survey current electrodes for emitting survey current therefrom; circuit means for energizing the focussing current electrode for emitting focussing current therefrom for directing the survey current flow from each of the survey current electrodes into the adjacent earth formations; circuit means responsive to the flow of each of the two survey currents for developing a pair of measure signals representative of the formation resistivities adjacent the two survey current electrodes; and means for combining these two measure signals for providing an indication of the earth formation resistivity gradient intermediate the two survey current electrodes.

8. In apparatus for investigating earth formations traversed by a borehole, the combination comprising: a wall-engaging pad member adapted for movement through a borehole and having a wall-engaging face comprising a pair of survey current electrodes and a focussing current electrode having portions defining a path encircling the survey current electrodes; circuit means for energizing one of the survey current electrodes for emitting survey current therefrom; circuit means for energizing the other of the survey current electrodes for emitting survey current therefrom; circuit means for energizing the focussing current electrode for emitting focussing current therefrom for directing the survey current flow from each of the survey current electrodes into the adjacent earth formations; a pair of transformer means individually coupled to different ones of the energizing circuit means for the survey current electrodes for individually developing a signal representative of the respective survey current; and circuit means responsive to these signals for providing an indication of the earth formation resistivity gradient intermediate the two survey current electrodes.

9. In apparatus for investigating earth formations traversed by a borehole, the combination comprising: a wall-engaging pad member adapted for movement through a borehole and having a wall-engaging face comprising a pair of survey current electrodes and a focussing current electrode having portions defining a path encircling the survey current electrodes; circuit means for energizing each of the survey current electrodes for emitting survey currents therefrom; circuit means for energizing the focussing current electrode for emitting focussing current therefrom for directing the survey current flow from each of the survey current electrodes into the adjacent earth formations; means responsive to the flow of each of the two survey currents for developing a pair of measure signals individually representative of the respective survey current; and circuit means responsive to these measure signals for developing a signal representative of the ratio thereof, such ratio signal providing an indication of the earth formation resistivity gradient intermediate the two survey current electrodes.

10. In apparatus for investigating earth formations traversed by a borehole, the combination comprising: a wall-engaging pad member adapted for movement through a borehole and having a wall-engaging face comprising a pair of survey current electrodes and a focussing current electrode having portions defining a path encircling the survey current electrodes; circuit means for energizing each of the survey current electrodes for emitting survey currents therefrom; circuit means for energizing the focussing current electrode for emitting focussing current therefrom for directing the survey current flow from each of the survey current electrodes into the adjacent earth formations; means responsive to the flow of each of the two survey currents for developing a pair of measure signals individually representative of the respective survey current; and circuit means responsive to these measure signals for developing a signal representative of the difference therebetween, such difference signal providing an indication of the earth formation resistivity gradient intermediate the two survey current electrodes.

11. In apparatus for investigating earth formations traversed by a borehole, the combination comprising: a wall-engaging pad member adapted for movement through a borehole and having a wall-engaging face comprising a pair of survey current electrodes and a focussing current electrode having portions defining a path encircling the survey current electrodes; circuit means for supplying an energizing voltage between a pair of output terminals; circuit means connecting each of the electrodes to one output terminal of the supply circuit means, the other output terminal being connected to a current return point which is spaced apart from the pad member; circuit means coupled to the supply circuit connections for each of the survey current electrodes for developing a pair of measure signals representative of the formation resistivities adjacent the two survey current electrodes; and circuit means for combining these two measure signals for providing an indication of the earth formation resistivity gradient intermediate the two survey current electrodes.

12. In apparatus for investigating earth formations traversed by a borehole, the combination comprising: a wall-engaging pad member adapted for movement through a borehole having a wall-engaging face comprising a pair of survey current electrodes and a focussing current electrode having portions defining a path encircling the survey current electrodes; circuit means for supplying an energizing voltage between a pair of output terminals; low impedance circuit means connecting each of the electrodes to one output terminal of the supply circuit means for maintaining each electrode at substantially the same voltage level, the other supply circuit output terminal being connected to a current return point which is spaced apart from the pad member; circuit means coupled to the supply circuit connections for each of the survey current electrodes for developing a pair of measure signals representative of the formation reistivities adjacent the two survey current electrodes; and circuit means for combining these two measure signals for providing an indication of the earth formation resistivity gradient intermediate the two survey current electrodes.

13. In apparatus for investigating earth formations traversed by a borehole, the combination comprising: a wall-engaging pad member adapted for movement through a borehole and having a wall-engaging face comprising a pair of survey current electrodes and a focussing current electrode having portions defining a path encircling the survey current electrodes; circuit means for supplying an energizing voltage between a pair of output terminals; low impedance circuit means connecting each of the electrodes to one output terminal of the supply circuit means for maintaining each electrode at substantially the same voltage level, the other supply circuit output terminal being connected to a current return point which is spaced apart from the pad member; a pair of transformers each having a low impedance primary winding connected in series with the supply circuit connection for one of the survey current electrodes for developing across the transformer secondary winding a measure signal representative of the current flow from the corresponding survey current electrode; and circuit means for combining these two measure signals for providing an indication of the earth formation resistivity gradient intermediate the two survey current electrodes.

14. In apparatus for investigating earth formations traversed by a borehole, the combination comprising: a wall-engaging pad member adapted for movement through a borehole and having a wall-engaging face comprising a pair of survey current electrodes and a focussing current electrode having portions defining a path encircling the survey current electrodes; circuit means for supplying an energizing voltage between a pair of output terminals; low impedance conductor means connecting each of the electrodes to one output terminal of the supply circuit means for maintaining each electrode at substantially the same voltage level, the other supply circuit output terminal being connected to a current return point which is spaced apart from the pad member; the conductor means for each survey current electrode including a transformer having a low impedance primary winding in series therewith for developing across the transformer secondary winding a measure signal representative of the current flow from the corresponding survey current electrode; and circuit means for combining these two measure signals for providing an indication of the earth formation resistivity gradient intermediate the two survey current electrodes.

15. Dipmeter apparatus for investigating the dip angle of boundaries between different earth formation regions traversed by a borehole comprising: three wall-engaging pad members each having a wall-engaging face comprising a pair of survey current electrodes and a focussing current electrode having portions defining a path encircling the survey current electrodes; means for moving the three pad members in unison through the borehole and for urging them against the borehole wall at three angularly spaced apart locations around the circumference thereof; circuit means for energizing each survey current electrode of each pad member for emitting survey current therefrom; circuit means for energizing the focussing current electrode of each pad member for emitting focussing current therefrom for directing the corresponding survey currents into the portion of the earth formation adjacent thereto; and means separately responsive to the flow of the survey currents from each pad member for providing indications of the earth formation resistivity gradients intermediate the survey current electrodes of each pad member.

16. Dipmeter apparatus for investigating the dip angle of boundaries between different earth formation regions traversed by a borehole comprising: three wall-engaging pad members each having a wall-engaging face comprising a pair of survey current electrodes and a focussing current electrode having portions defining a path encircling the survey current electrodes; means for moving the three pad members in unison through the borehole and for urging them against the borehole wall at three angularly spaced apart locations around the circumference thereof; circuit means for supplying substantially the same energizing potential to each survey current electrode of each pad member and to the focussing current electrode of each pad member for emitting survey currents from the survey current electrodes and for emitting focussing currents from the focussing current electrodes for directing the corresponding survey currents into the portions of the earth formation adjacent thereto; and means separately responsive to the flow of the survey currents from each pad member for providing indications of the earth formation resistivity gradients intermediate the survey current electrodes of each pad member.

17. In apparatus for investigating earth formations traversed by a borehole, the combination comprising: an elongated support member adapted for movement through a borehole; a wall-engaging pad member having a wall-engaging face comprising a survey current electrode and a focussing current electrode; means for coupling the pad member to the support member and adapted to urge the pad member against the borehole wall; at least a portion of the support member located adjacent the pad member having a conductive surface for emitting current therefrom; circuit means for energizing the survey current electrode for emitting survey current therefrom; circuit means for energizing both the focussing current electrode and the conductive surface for emitting from each focussing current for directing the survey current flow into the adjacent earth formation; and means responsive to the flow of the survey current for providing an indication of the formation resistivity.

References Cited in the file of this patent

UNITED STATES PATENTS

| | | |
|---|---|---|
| 2,446,303 | Owen | Aug. 3, 1948 |
| 2,669,689 | Doll | Feb. 14, 1954 |
| 2,712,630 | Doll | July 5, 1955 |
| 2,750,557 | Bricaud | June 12, 1956 |
| 2,786,178 | Doll | Mar. 19, 1957 |
| 2,823,349 | French | Feb. 11, 1958 |
| 2,961,600 | Tanguy | Nov. 22, 1960 |